(12) United States Patent
Kobori

(10) Patent No.: US 12,155,969 B2
(45) Date of Patent: Nov. 26, 2024

(54) SURVEILLANCE VIDEO OUTPUT SYSTEM AND SURVEILLANCE VIDEO OUTPUT METHOD

(71) Applicant: TOYOTA JIDOSHA KABUSHIKI KAISHA, Toyota (JP)

(72) Inventor: Norimasa Kobori, Tokyo-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 38 days.

(21) Appl. No.: 18/075,623

(22) Filed: Dec. 6, 2022

(65) Prior Publication Data

US 2023/0188678 A1 Jun. 15, 2023

(30) Foreign Application Priority Data

Dec. 10, 2021 (JP) .................. 2021-201024

(51) Int. Cl.
*H04N 7/18* (2006.01)
*H04N 5/77* (2006.01)

(52) U.S. Cl.
CPC .............. *H04N 7/181* (2013.01); *H04N 5/77* (2013.01)

(58) Field of Classification Search
None
See application file for complete search history.

(56) References Cited

U.S. PATENT DOCUMENTS 11,336,955 B1 * 5/2022 White .................... G06Q 50/26
2009/0060271 A1 * 3/2009 Kim ....................... H04N 7/181
382/103
2017/0138752 A1 * 5/2017 Mermelstein .......... G08G 1/161
2018/0218582 A1 * 8/2018 Hodge ............. H04N 21/44004
2018/0330610 A1 * 11/2018 Wu ......................... G08G 1/164
2019/0122052 A1 * 4/2019 Miyake ................ G06V 20/52
2020/0073969 A1 * 3/2020 Kursar ................. G06V 20/56
2021/0102821 A1 * 4/2021 Shiotsu .............. G01C 21/3647
2022/0179900 A1 * 6/2022 Kursar .................. G06F 16/71
2024/0027605 A1 * 1/2024 Goldhammer .......... G08G 1/04

FOREIGN PATENT DOCUMENTS

| JP | 2007-194722 A | | 8/2007 | | |
|---|---|---|---|---|---|
| JP | 2009-60477 A | | 3/2009 | | |
| JP | 2011-180693 A | | 9/2011 | | |
| KR | 20160084235 A | * | 7/2016 | ............... | H94N 5/77 |
| WO | WO-2020051087 A1 | * | 3/2020 | ........... | G06F 16/532 |

* cited by examiner

*Primary Examiner* — Gelek W Topgyal
(74) *Attorney, Agent, or Firm* — Oliff PLC

(57) ABSTRACT

A system for outputting a surveillance video, the system comprises a plurality of cameras each of which is mounted on a movable object, one or more memories storing, for each of the plurality of cameras, captured video data and time series position data, and one or more processors. The one or more processors execute selecting, for each predetermined time width, an observation camera which is one camera with the time series position data in which data within the predetermined time width are included in an observation area, and acquiring the captured video data within the predetermined time width of the observation camera. Then the one or more processors execute outputting the captured video data acquired for each of the predetermined time width in chronological order. Wherein the selecting the observation camera includes selecting one camera with the longest distance to travel in the observation area within the predetermined time width.

6 Claims, 12 Drawing Sheets

SURVEILLANCE VIDEO OUTPUT SYSTEM AND SURVEILLANCE VIDEO OUTPUT METHOD

CROSS-REFERENCE TO RELATED APPLICATION

The present application claims priority under 35 U.S.C. § 119 to Japanese Patent Application No. 2021-201024, filed Dec. 10, 2021, the contents of which application are incorporated herein by reference in their entirety.

BACKGROUND

Technical Field

The present disclosure relates to a technique for outputting a surveillance video. Also, the present disclosure relates to a technique for using video data captured by a camera mounted on a movable object.

Background Art

In recent years, various techniques using video data captured by a camera mounted on a movable object have been considered. Patent Literature 1 discloses a monitoring system including a plurality of in-vehicle information terminals each of which transmits a video capturing a predetermined range including a specific position, the video captured by an in-vehicle camera, and a video information collection device that acquires a plurality of the video each of which capturing the predetermined range at different time from the plurality of in-vehicle information terminals and generates a video capturing the specific position over time based on the plurality of the video.

In addition, the following Patent Literature 2 and Patent Literature 3 disclose techniques using video captured by a camera mounted on a movable object.

LIST OF RELATED ART

Patent Literature 1: Japanese Laid-Open Patent Application Publication No. JP-2007-194722
Patent Literature 2: Japanese Laid-Open Patent Application Publication No. JP-2011-180693
Patent Literature 3: Japanese Laid-Open Patent Application Publication No. JP-2009-060477

SUMMARY

In recent years, it has become common to mount a camera on a vehicle for application such as a drive recorder or a sensor. Therefore, surveillance system using video data captured by a camera mounted on a movable object is expected as a technique for reducing infrastructure costs.

In the monitoring system disclosed in Patent Literature 1, a specific position such as an incident point or a traffic congestion point is received as a request, and a video capturing the specific position over time is generated. However, it is assumed that the user monitoring the video wants to check a wide range of points not the specific position.

In view of the above-described problem, an object of the present disclosure is to provide a technique that can output a surveillance video displaying a wide range of points by using video data captured by a camera mounted on a movable object.

A first disclosure is directed to a system.

The system comprises:
a plurality of cameras each of which is mounted on a movable object;
one or more memories storing, for each of the plurality of cameras, captured video data and time series position data that show a camera position or a movable object position at each time; and
one or more processors.

The one or more processors are configured to execute:
receiving designation of an observation area;
selecting, for each predetermined time width, an observation camera from the plurality of cameras, the observation camera having a relation with the time series position data in which data within the predetermined time width are included in the observation area;
acquiring the captured video data within the predetermined time width captured by the observation camera; and
outputting the captured video data acquired for each of the predetermined time width in chronological order, or outputting a video data combining the captured video data acquired for each of the predetermined time width in chronological order,
wherein the selecting the observation camera includes, when there are two or more cameras having a relation with the time series position data in which data within the predetermined time width are included in the observation area, selecting one camera with the longest distance to travel in the observation area within the predetermined time width.

A second disclosure is directed to a system further having the following features with respect to the system according to the first disclosure.

The one or more processors are further configured to execute receiving designation of an observation direction in the observation area, and
the selecting the observation camera includes selecting the observation camera under a further condition that a movement direction of the observation camera or a movement direction of the movable object satisfies the observation direction.

A third disclosure is directed to a system further having the following features with respect to the system according to the second disclosure.

The observation area is a segmented area of a space divided by grid.

A fourth disclosure is directed to a method.
The method comprises:
storing, for each of a plurality of cameras which is mounted on a movable object, captured video data and time series position data that show a camera position or a movable object position at each time in one or more memories;
receiving designation of an observation area;
selecting, for each predetermined time width, an observation camera from the plurality of cameras, the observation camera having a relation with the time series position data in which data within the predetermined time width are included in the observation area;
acquiring the captured video data within the predetermined time width captured by the observation camera; and
outputting the captured video data acquired for each of the predetermined time width in chronological order, or outputting a video data combining the captured video data acquired for each of the predetermined time width in chronological order, wherein the selecting the observation camera includes, when there are two or more cameras having a relation with the time series position data in which data within the predetermined time width are included in the observation area, selecting one camera with the longest distance to travel in the observation area within the predetermined time width.

A fifth disclosure is directed to a method further having the following features with respect to the method according to the fourth disclosure.

The method further comprises receiving designation of an observation direction in the observation area,
wherein the selecting the observation camera includes selecting the observation camera under a further condition that a movement direction of the observation camera or a movement direction of the movable object satisfies the observation direction.

A sixth disclosure is directed to a method further having the following features with respect to the method according to the fifth disclosure.

The observation area is a segmented area of a space divided by grid.

According to the present disclosure, an observation area is designated. Thereafter, an observation camera is selected from the plurality of cameras for each predetermined time width Where the observation camera is a camera having a relation with time series position data in which data within the predetermined time width is included in the observation area. And a captured video data within the predetermined time width captured by the observation camera is acquired. Then, the captured video data acquired for each of the predetermined time width is output in chronological order. Or a video data combining the captured video data acquired for each of the predetermined time width in chronological order is output.

It is thus possible to output a surveillance video displaying a wide range of points. Where the surveillance video is composed of the captured video data captured by a camera mounted on a movable object.

Further, when there are two or more cameras having a relation with the time series position data in which data within the predetermined time width is included in the observation area, the observation camera is one camera with the longest distance to travel in the observation area within the predetermined time width. It is thus possible to select, as the observation camera, a camera that capturing in a wider range. Consequently, it is possible to output a surveillance video displaying a wider range of points within the predetermined time width.

EMBODIMENTS

Hereinafter, an embodiment of the present disclosure will be described with reference to the drawings. Note that when the numerals of the numbers, the quantities, the amounts, the ranges, and the like of the respective elements are mentioned in the embodiments shown as follows, the present disclosure is not limited to the mentioned numerals unless specially explicitly described otherwise, or unless the invention is explicitly specified by the numerals theoretically. Furthermore, structures or the like that are described in conjunction with the following embodiment is not necessarily essential to the concept of the present disclosure unless explicitly described otherwise, or unless the present disclosure is explicitly specified by the structures or the like theoretically. Note that in the respective drawings, the same or corresponding parts are assigned with the same reference signs, and redundant explanations of the parts are properly simplified or omitted.

1. First Embodiment 1-1. Outline

Figure 1:
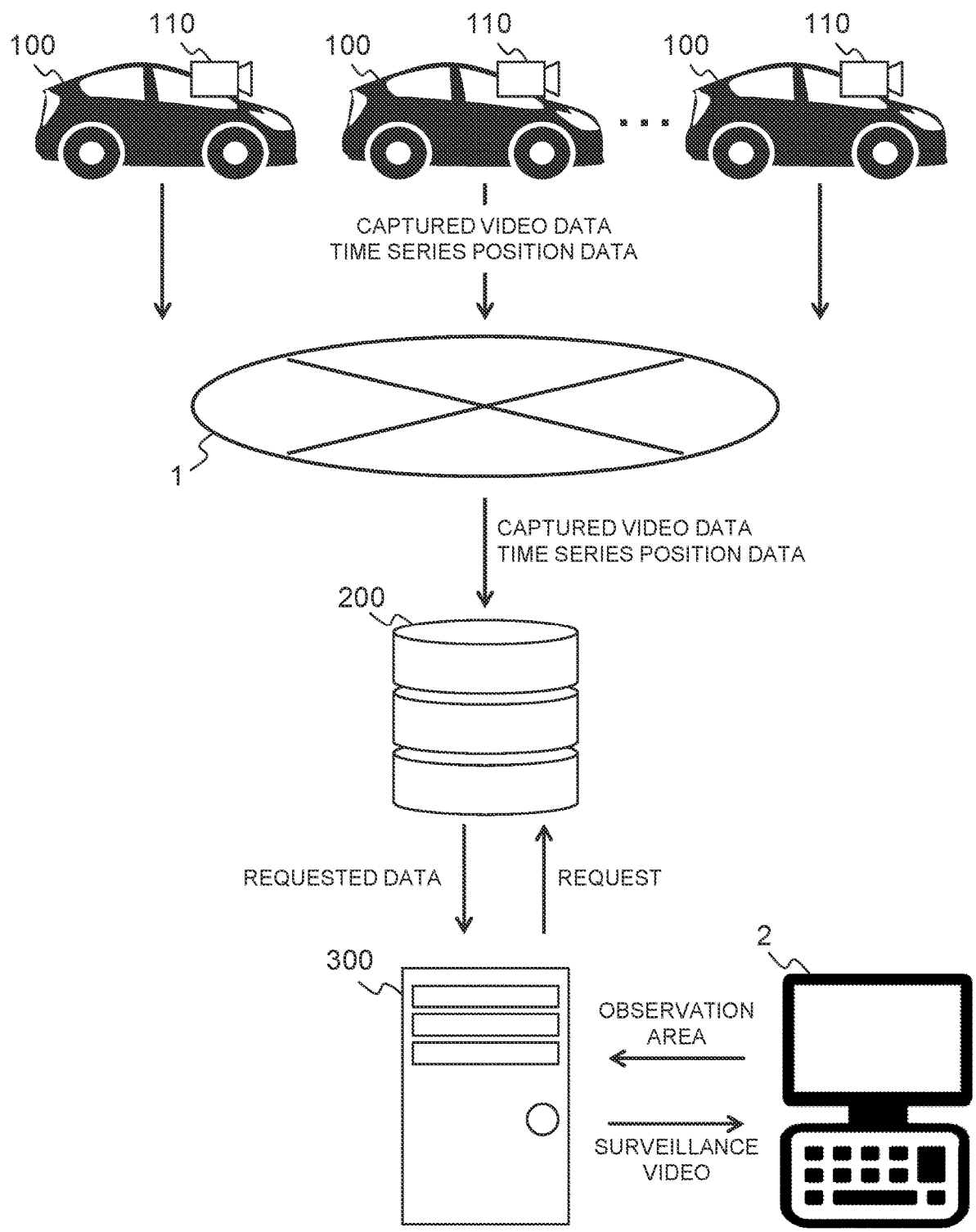
FIG. 1 is a conceptual diagram showing an outline of a configuration of a surveillance video output system according to the first embodiment.

FIG. 1 is a conceptual diagram showing an outline of a configuration of a surveillance video output system 10 according to the first embodiment. The surveillance video output system 10 includes a plurality of cameras 110 each of which is mounted on a movable object 100, a memory 200, and a processing apparatus 300.

The movable object 100 is typically a vehicle traveling on roads. Other examples of the movable object 100 include a bicycle, a drone, and a patrol robot. Each of the plurality of cameras 110 capturing the environment around the movable object 100.

The movable object 100 on which each of the plurality of cameras 110 is mounted transmits, to the memory 200 via a communication network 1, video data (captured video data) captured by each of the plurality of cameras 110 and time series position data that show a position (camera position) of each of the plurality of cameras 110 at each time. The time series position data may show a position of the movable object 100 at each time. Here, the communication network 1 is, for example, the Internet. The communication network 1 may be another network constructed for the surveillance video output system 10. In addition, the captured video data and the time series position data may be configured to be able to be determined for which one of the plurality of cameras 110.

The memory 200 is connected to the communication network 1 and acquires the captured video data and the time series position data from the movable object 100. Then the memory 200 stores the captured video data and the time series position data. The memory 200 is, for example, a database server.

The memory 200 and the processing apparatus 300 are configured to be able to communicate information each other. For example, the memory 200 and the processing apparatus 300 are connected by a cable harness, an optical communication line, a wireless communication terminal, or the like. Alternatively, the processing apparatus 300 may be configured to connect to the communication network 1 and communicate information with the memory 200 via the communication network 1. Alternatively, the memory 200 and the processing apparatus 300 may be integrally configured. For example, the processing apparatus 300 may be a server connected to the communication network 1, and the memory 200 may be a storage device (for example, a nonvolatile memory, a volatile memory, an HDD, an SSD, or the like) included in the server.

The memory 200 receives a request for data from the processing apparatus 300 and transmits the requested data to the processing apparatus 300. As a result, the processing apparatus 300 acquires the data stored in the memory 200.

The processing apparatus 300 is connected to an input/output device 2. The processing apparatus 300 receives designation of an observation area as an input and outputs a surveillance video. The input/output device 2, for example, integrally includes an input unit (a keyboard, a switch, a touch panel, an operation panel, or the like) and an output unit (a display, a speaker, or the like). In this case, the observation area is designated by the operation of the input unit. And information shows the designated observation area is transmitted to the processing apparatus 300. Further, the surveillance video outputted from the processing apparatus 300 is transmitted to the input/output device 2. And the output unit displays the surveillance video.

Figure 2:
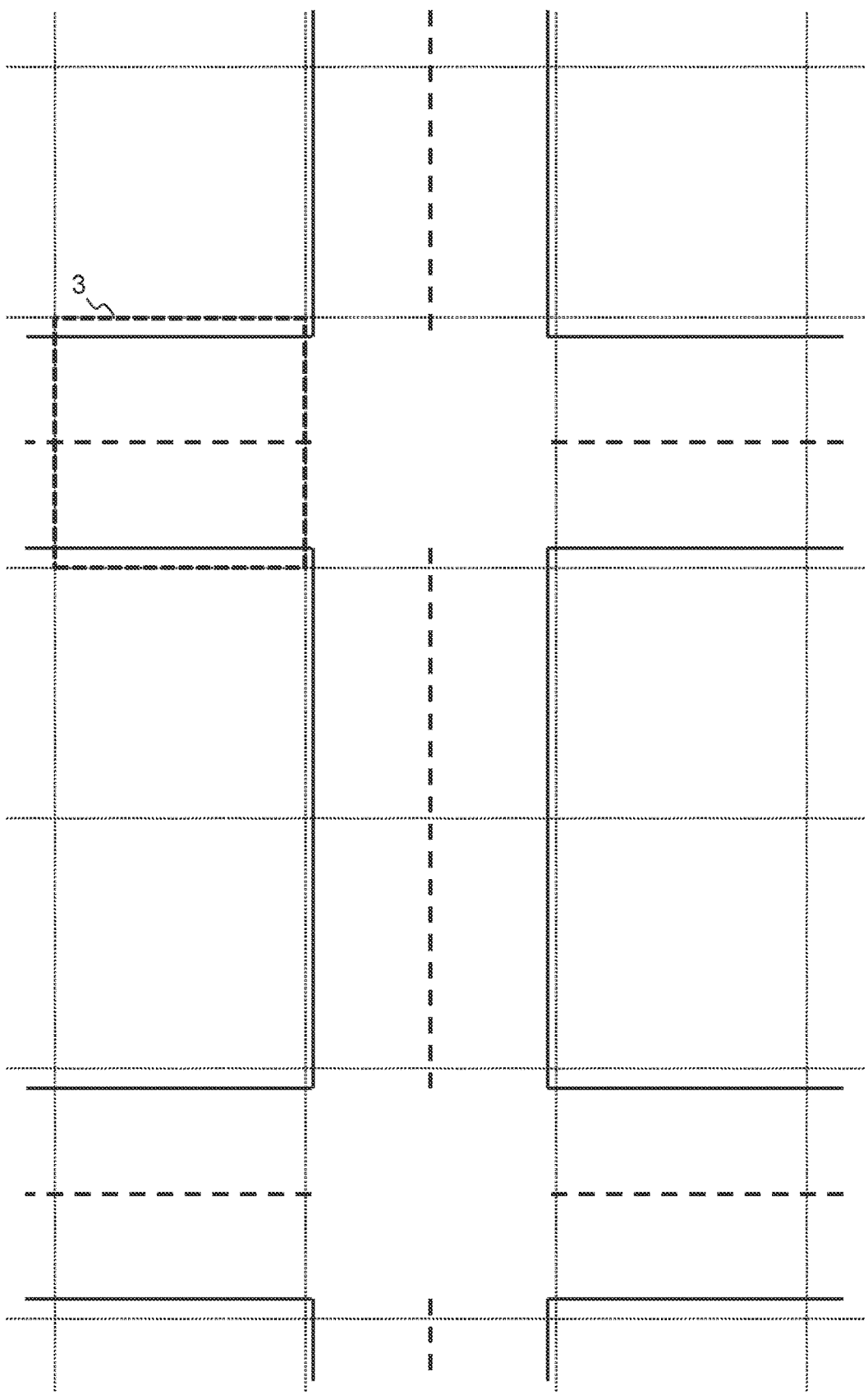
FIG. 2 is a conceptual diagram showing an example of designation of an observation area in a case where a movable object is a vehicle traveling on roads.

The observation area may be a segmented area of a space divided by grid. In this case, the designation of the observation area is performed to designate one segmented area. FIG. 2 is a conceptual diagram illustrating an example of the designation of the observation area. FIG. 2 illustrates a case where the movable object 100 is a vehicle traveling on roads. As shown in FIG. 2, when the movable object 100 is a vehicle traveling on roads, the space can be considered as a road map, and the road map is divided by grid. The designation of the observation area can be performed to designate one segmented area of the road map divided by grid. For example, in FIG. 2, the segmented area 3 can be designated as the observation area. The grid size may be suitably determined in accordance with an environment in which the surveillance video output system 10 is applied. Further, the grid size may not be uniform over the entire road map. The space may be a three-dimensional space. And the division by grid may be performed in three dimensions.

In this way, the designation of the observation area can be performed by designating one segmented area of the space divided by grid. It is thus possible to make the designation of the observation area easier. In particular, the division by grid can easily provide segmented areas for the entire target space.

The designation of the observation area may be performed by other methods. One example is to designate an arbitrary area on the road map (for example, by surrounding a portion of the road map with a specific figure or freehand lines) displayed on the output unit of the input/output device 2.

Figure 3:
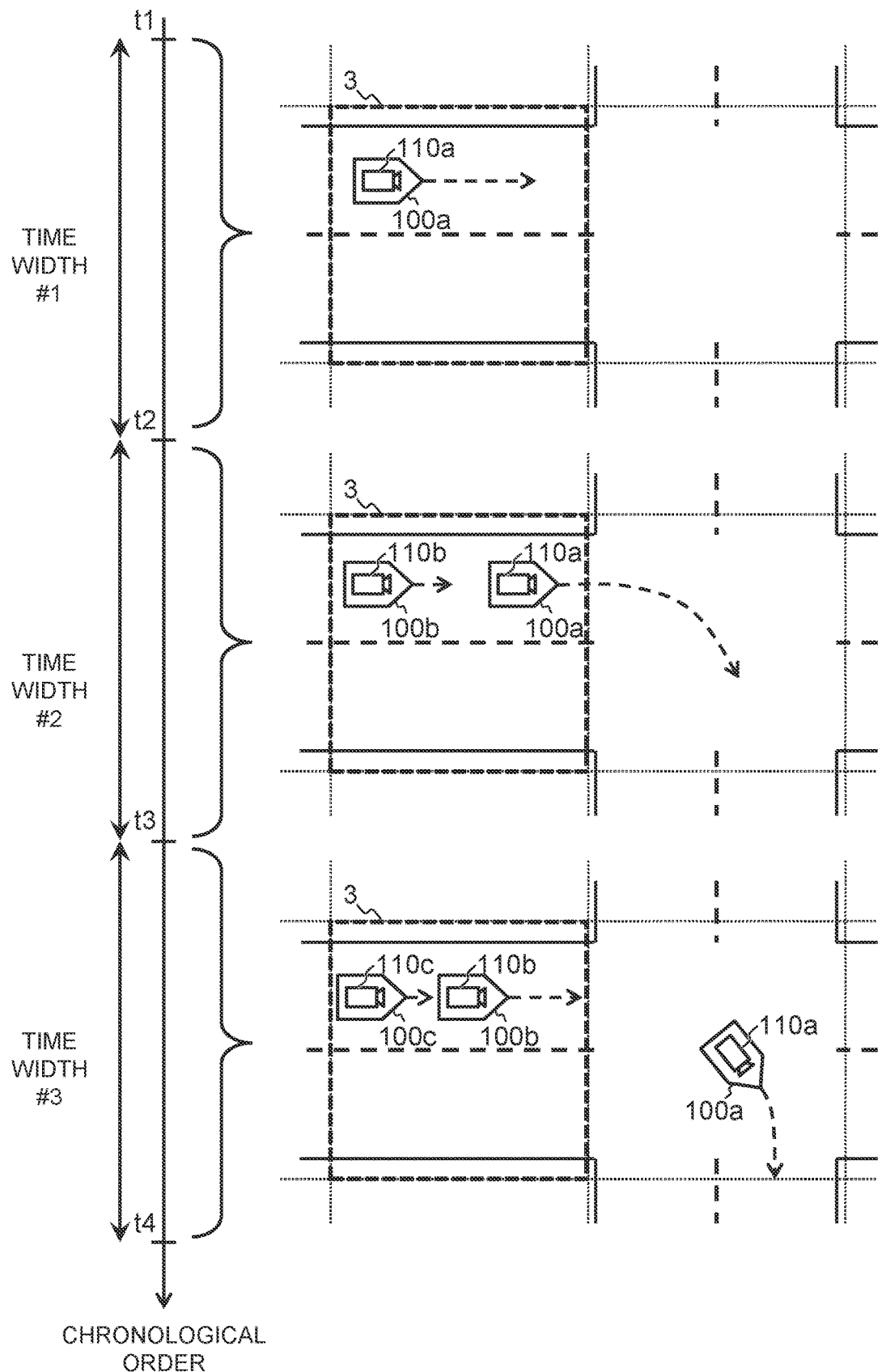
FIG. 3 is a conceptual diagram for explaining an outline of a video acquiring process.

The surveillance video is composed of the captured video data acquired in a process (video acquiring process) executed by the processing apparatus 300. FIG. 3 is a conceptual diagram for explaining the outline of the video acquiring process. In FIG. 3, the observation area is the segmented area 3 of the divided road map (See FIG. 2).

In the video acquiring process, the processing apparatus 300 executes selecting, for each predetermined time width, an observation camera from the plurality of cameras 110, the observation camera having a relation with the time series position data in which data within the predetermined time width are included in the observation area. And the processing apparatus 300 executes, for each of the predetermined time width, acquiring the captured video data within the predetermined time width captured by the observation camera. FIG. 3 illustrates three situations for three time widths (#1, #2, and #3) in chronological order. In each of the three situations, FIG. 3 illustrates one or more movable objects each of which a camera is mounted on. A dashed arrow indicates a movement of the camera (or the movable object) within the time width. The processing apparatus 300 acquires the time series position data of the plurality of cameras 110 from the memory 200 when executing the video acquiring process.

Within the time width #1, the camera 110a is located in the observation area. That is, in the time series data for the camera 110a, data within the time width #1 are included in the in the observation area. Therefore, in the video acquiring process, the processing apparatus 300 selects the camera 110a as the observation camera for the time width #1. And the processing apparatus 300 acquires the captured video data within the time width #1 of the camera 110a.

In the situation for the time width #2, the camera 110a is only temporarily located in the observation area within the time width #2. That is, in the time series data for the camera 110a, data within the time width #2 are partially not included in the observation area. On the other hand, the camera 110b is located in the observation area within the time width #2. That is, in the time series data for the camera 110b, data within the time width #2 are included in the observation area. Therefore, in the video acquiring process, the processing apparatus 300 selects the camera 110b as the observation camera for the time width #2. And the processing apparatus 300 acquires the captured video data within the time width #2 of the camera 110b.

In the situation for the time width #3, both the camera 110b and the camera 110c are located in the observation area within the time width #3. That is, in both of the time series data for the camera 110b and the camera 110c, data within the time width #3 are included in the observation area. In this case, in the video acquiring process according to the first embodiment, the processing apparatus 300 selects one camera with the longest distance to travel in the observation area within the time width #3 based on the time series data. As shown in FIG. 3, in the situation for the time width #3, the camera 110b travels longer than the camera 110c (Compare the length of the dashed arrow). Therefore, in the video acquiring process, the processing apparatus 300 selects the camera 110b as the observation camera for the time width #3. And the processing apparatus 300 acquires the captured video data within the time width #3 of the camera 110b.

In this way, when there are two or more cameras having a relation with the time series position data in which data within the predetermined time width is included in the observation area, one camera with the longest distance to travel in the observation area within the predetermined time width is selected as the observation camera. It is possible to select a camera, as the observation camera, capturing in a wider range. Consequently, it is possible to output the surveillance video displaying a wide range of points.

Note that in the video acquiring process, the interval of each of the predetermined time width may be different each other. For example, in FIG. 3, the intervals of the time width #1, the time width #2, and the time width #3 may be different from each other.

As described above, in the video acquiring process, the processing apparatus 300 selects the observation camera from the plurality of cameras 110 for each predetermined time width. And the processing apparatus 300 acquires the captured video data within the predetermined time width captured by the observation camera. Then, the processing apparatus 300 executes outputting, as the surveillance video, the captured video data acquired for each of the predetermined time width in chronological order. Alternatively, the processing apparatus 300 executes outputting, as the surveillance video, a video data combining the captured video data acquired for each of the predetermined time width in chronological order.

For example, in the case shown in FIG. 3, the processing apparatus 300 first outputs the captured video data within the time width #1 of the camera 110a. Next, the processing apparatus 300 outputs the captured video data within the time width #2 of the camera 110b. Next, the processing apparatus 300 outputs the captured video data within the time width #3 of the camera 110b. This is, for example, a case of streaming the surveillance video. In this case, the processing apparatus 300 may acquire the time series position data of the plurality of cameras 110 for each of the predetermined time width.

Alternatively, in the case shown in FIG. 3, the processing apparatus 300 outputs a video data combining the captured video data within the time width #1 of the camera 110a, the captured video data within the time width #2 of the camera 110b, and the captured video data within the time width #3 of the camera 110b in this order. This is, for example, a case where the processing apparatus 300 receives a time period for the surveillance video as an input and outputs the surveillance video within the time period. In this case, the processing apparatus 300 may acquire the time series position data of the plurality of cameras 110 within the time period.

When there is no camera having a relation with the time series position data in which data within the predetermined time width are included in the observation area, the processing apparatus 300 may not output the surveillance video for that predetermined time width. That is, the surveillance video for that predetermined time width may be blacked out.

1-2. Configuration

Hereinafter, configurations of the movable object 100 and the processing apparatus 300 included in the surveillance video output system 10 will be described.

1-2-1. Movable Object

Figure 4:
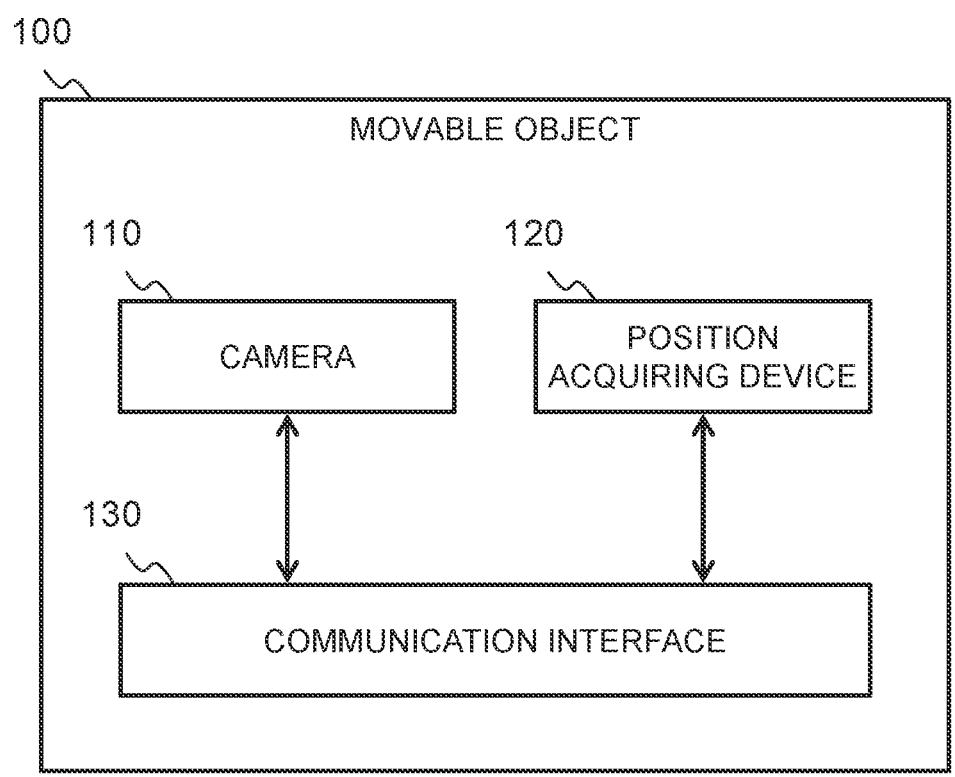
FIG. 4 is a block diagram showing a schematic configuration of a movable object.

FIG. 4 is a block diagram showing a schematic configuration of the movable object 100. The movable object 100 comprises a camera 110, a position acquiring device 120, and a communication interface 130. The camera 110 and the communication interface 130 are configured to be able to transmit information to each other. Similarly, the position acquiring device 120 and the communication interface 130 are configured to be able to transmit information to each other. Typically, they are electrically connected by cable harnesses.

The camera 110 outputs a captured video data. The captured video data output from the camera 110 is transmitted to the communication interface 130. The captured video data may include information for time points of capturing. For example, the captured video data is a set of a plurality of pieces of image data each of which has information for a time point of capturing. The camera 110 may be a camera prepared for the surveillance video output system 10 or may be a camera used for another purpose. For example, the camera 110 may be a drive recorder.

The position acquiring device 120 acquires the position of the camera 110 or the position of the movable object 100 at each time. And the position acquiring device 120 outputs time series position data that show the acquired position at each time. The time series position data output from the position acquiring device 120 is transmitted to the communication interface 130. The position at each time shown by the time series position data is, for example, coordinates on a map. Examples of the position acquiring device 120 include a GPS receiver and an ECU (Electronic Control Unit) that executes localization. When the position acquiring device 120 is configured to acquire the position of the camera 110, the position acquiring device 120 may be configured integrally with the camera 110.

The communication interface 130 is a device for transmitting and receiving information via the communication network 1. In particular, the communication interface 130 transmits the captured video data acquired from the camera 110 and the time series position data acquired from the position acquiring device 120 to the memory 200 via the communication network 1. The communication interface 130 is, for example, configured by a device that performs wireless communication with a base station connected to the communication network 1.

The captured video data and the time series position data transmitted by the communication interface 130 may include information for identifying the camera 110. For example, the captured video data and the time series position data include ID information specifying each of the plurality of cameras 110. In this case, the ID information may be added to the captured video data and the time series position data in the camera 110 and the position acquiring device 120, or the communication interface 130 may add the ID information to the captured video data and the time series position data before transmitting.

The format of transmission of the captured video data and the time series position data by the communication interface 130 and the format of management of the captured video and the time series position data in the memory 200 may employ suitable formats according to the environment in which the surveillance video outputting system 10 is applied. For example, when the captured video data and the time series position data include the ID information, the communication interface 130 may separately transmit the captured video data and the time series position data, and the memory 200 may separately manage the captured video data and the time series position data for each ID information. On the other hand, when the captured video data and the time series position data do not include the ID information, the communication interface 130 may associate the captured video data and the time series position data with each other and add ID information to them. Then the communication interface 130 may transmit them with the ID information as one piece of data, and the memory 200 may associate and manage the captured video data and the time series position data for each ID information. In this case, the associating the captured video data and the time series position data can be performed based on time points of capturing for the captured video data and time points of acquiring for the time series position data.

1-2-2. Processing Apparatus

Figure 5:
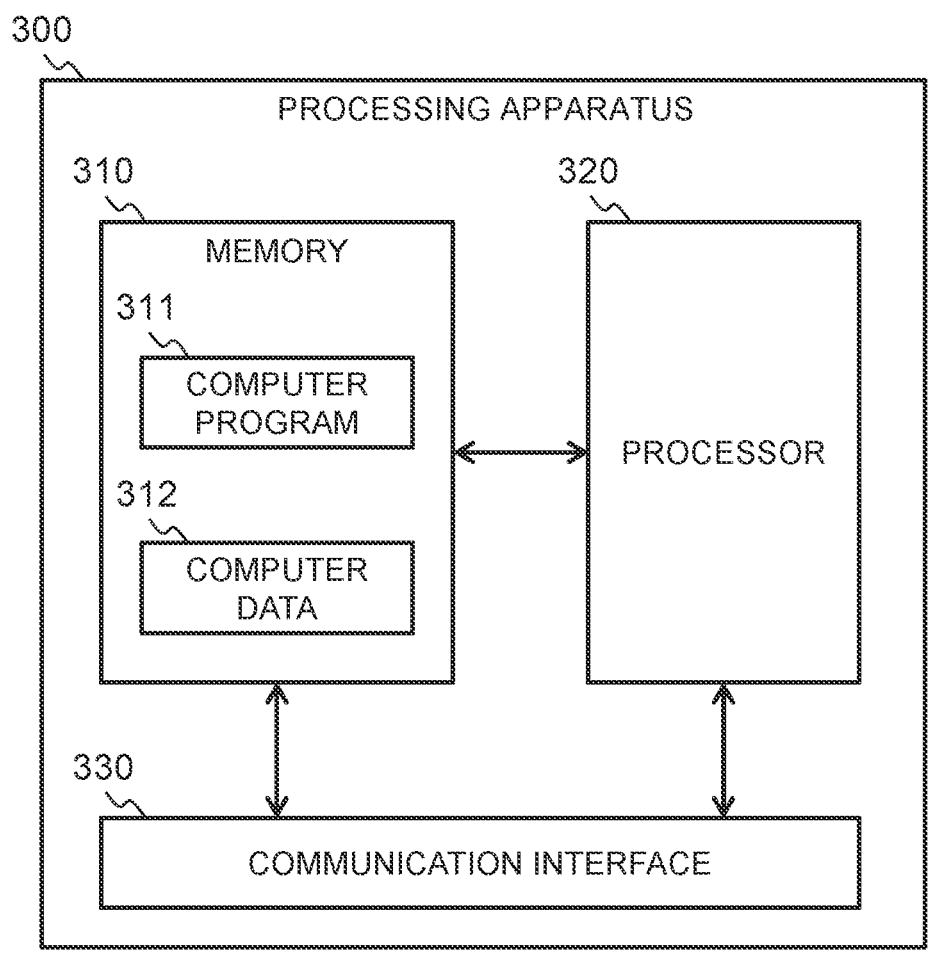
FIG. 5 is a block diagram showing a schematic configuration of a processing apparatus.

FIG. 5 is a block diagram showing a schematic configuration of the processing apparatus 300. The processing apparatus 300 includes one or more memories 310, one or more processors 320, and a communication interface 330. The one or more memories 310, the one or more processors 320, and the communication interface 330 are configured to be able to communicate information each other.

The communication interface 330 is a device for transmitting and receiving information to and from external devices. In particular, the processing apparatus 300 acquires the requested data from the memory 200 via the communication interface 330. In addition, the processing apparatus 300 receives information for the designation of the observation area from the input/output device 2 via the communication interface 330. And the processing apparatus 300 outputs the surveillance video to the input/output device 2 via the communication interface 330. An example of the communication interface 330 is a communication unit that executes a process for generating a communication signal.

The one or more memories 310 store a computer program 311 executable by the one or more processors 320, and computer data 312 necessary for processing executed by the one or more processors 320. The one or more memories 310 may be the one or more non-transitory computer readable media. Examples of the one or more memories 310 include a volatile memory, a non-volatile memory, an HDD, and an SSD. Examples of the computer data 312 include the captured video data and the time series position data acquired from the memory 200, information for the designation of the observation area acquired from the input/output device 2, parameter information related to the computer program 311, and the like. Information which the processing apparatus 300 acquires via the communication interface 330 is stored in the one or more memories 310 as the computer data 312.

The one or more processors 320 read the computer program 311 and the computer data 312 from the one or more memories 310 and execute processing according to the computer program 311 based on the computer data 312. By the one or more processors 320 executing processing according to the computer program 311 based on the computer data 312, executing a process of requiring the designation of the observation area as an input and outputting the surveillance video is realized in the processing apparatus 300.

1-3. Surveillance Video Output Method

Hereinafter, processing executed by the one or more processors 320, and further, a surveillance video output method realized by the surveillance video output system 10 according to the first embodiment will be described.

Figure 6:
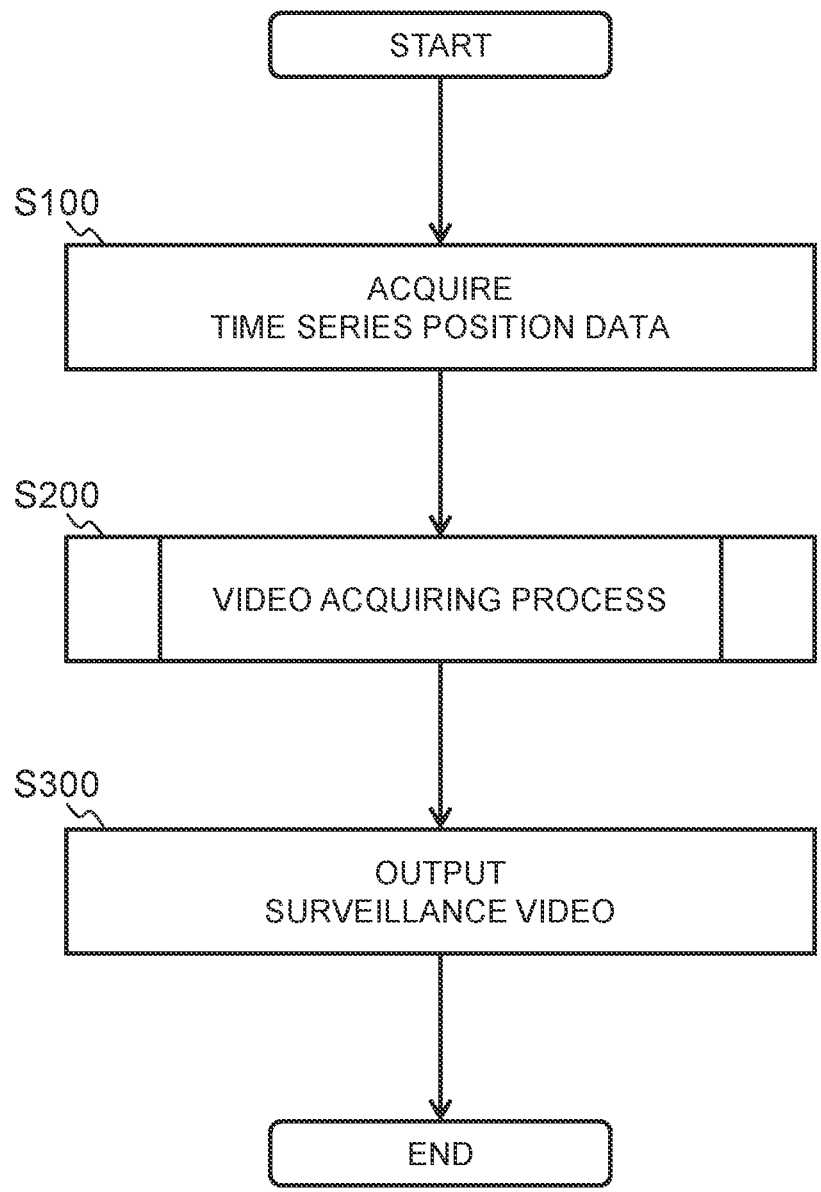
FIG. 6 is a flowchart showing a surveillance video output method.

FIG. 6 is a flowchart showing the surveillance video output method implemented by the surveillance video output system 10 according to the first embodiment. The flowchart illustrated in FIG. 6 is started after the processing apparatus 300 receives the designation of the observation area as an input. However, in the case of streaming the surveillance video or the like, the flowchart shown in FIG. 6 is repeatedly executed at predetermined intervals. Each process of the flowchart shown in FIG. 6 is executed at a predetermined control cycle.

In Step S100, the one or more processors 320 execute acquiring the time series position data of the plurality of cameras 110 from the memory 200. Here, the acquiring the time series position data may be executed to acquire data for a predetermined past time from the present time or may be executed to acquire data for a specific past time period. The former is, for example, a case of streaming the surveillance video. The latter is, for example, a case where outputting the surveillance video within the specific past time period. In the latter case, the specific past time period is a desired time period for outputting the surveillance video.

After Step S100, the process proceeds to Step S200.

In Step S200, the one or more processors 320 executes the video acquiring process. Details of the processing executed by the one or more processors 320 in the video acquiring process will be described later. In the video acquiring process, the one or more processors 320 selects, for each predetermined time width, the observation camera and acquires the captured video data within the predetermined time width captured by the observation camera.

After Step S200, the process proceeds to Step S300.

In Step S300, the one or more processors 320 executes outputting, as the surveillance video, the captured video data acquired for each of the predetermined time width in Step S200 in chronological order. Alternatively, one or more processors 320 executes outputting, as the surveillance video, a video data combining the captured video data acquired for each of the predetermined time width in Step S200 in chronological order. As a result, the surveillance video is displayed on the input/output device 2.

After Step S300, the process ends.

Figure 7:
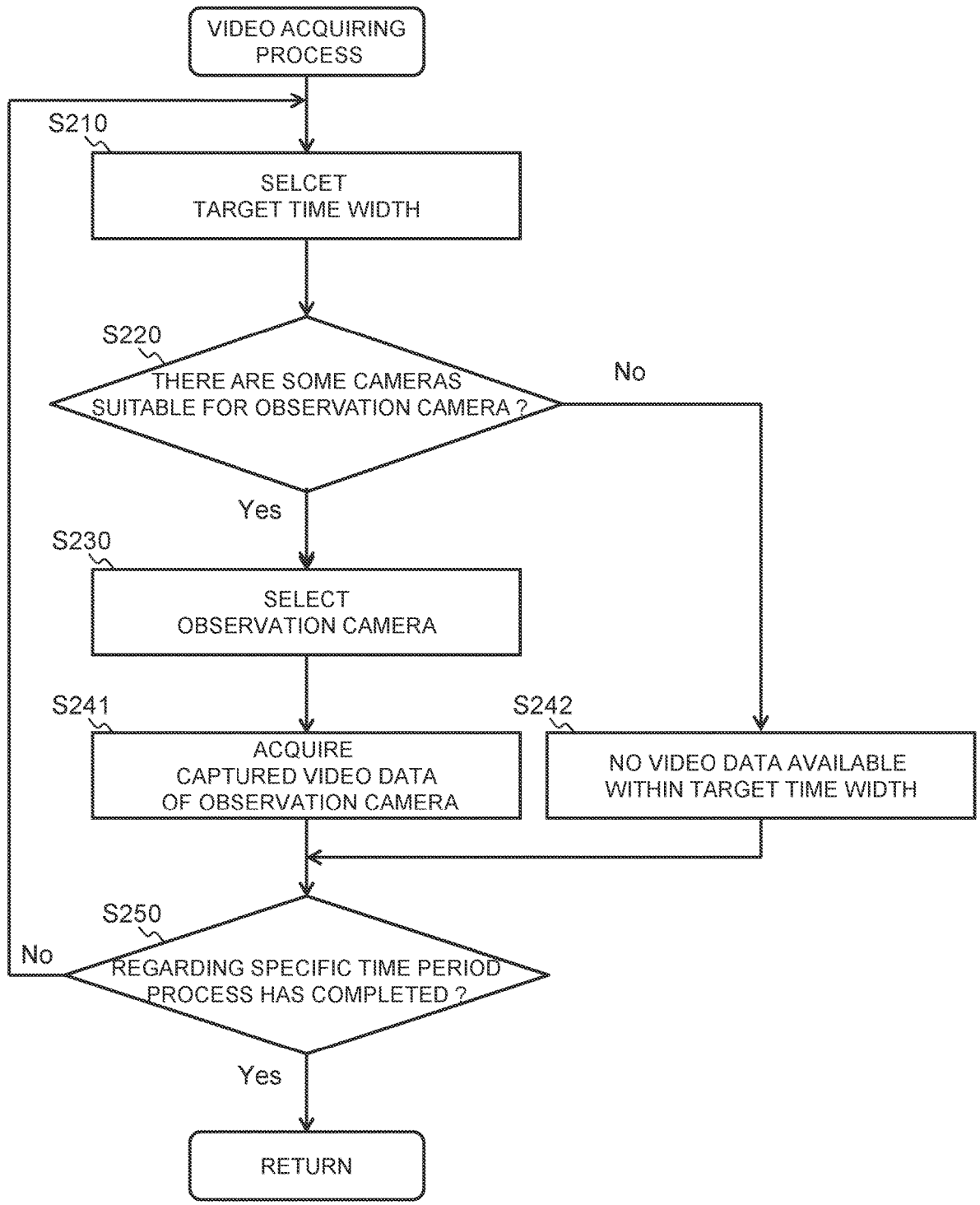
FIG. 7 is a flowchart showing processing executed in the video acquiring process.

Hereinafter, details of the processing executed by the one or more processors 320 in the video acquiring process (Step 200) will be described. FIG. 7 is a flowchart illustrating processing executed by the one or more processors 320 in the video acquiring process.

In Step S210, the one or more processors 320 select one predetermined time width (target time width) for which the captured video data to be acquired. Here, the target time width is a part of a specific time period for which the surveillance video is to be displayed. The interval of the target time width may be given in advance as the computer program 311 or the computer data 312.

After Step S210, the process proceeds to Step S220.

In Step S220, the one or more processors 320 determine whether or not there are some cameras, among the plurality of cameras 110, suitable for the observation camera. Where the cameras suitable for the observation camera are cameras having a relation with the time series data in which data within the target time width selected in Step S210 are included in the observation area. The one or more processors 320 can determine that based on the time series position data of the plurality of cameras 110.

When there are some cameras suitable for the observation camera (Yes in Step S220), the process proceeds to Step S230. When there is no camera suitable for the observation camera (No in Step S220), the one or more processors 320 determine that there is no video data available within target time width (Step S242). Then, the process proceeds to Step S250.

In Step S230, the one or more processors 320 select the observation camera. Here, when it is determined in Step S220 that there is only one camera suitable for the observation camera, the one or more processors 320 select that camera as the observation camera. On the other hand, when it is determined in Step S220 that there are two or more cameras suitable for the observation camera, the one or more processors 320 select, as the observation camera, one camera with the longest distance to travel in the observation area within the target time width.

After Step S230, the process proceeds to Step S241.

In Step S241, the one or more processors 320 acquire the captured video data within the target time width captured by the observation camera selected in Step S230.

After Step S241, the process proceeds to Step S250.

In Step S250, the one or more processors 320 determine whether or not the process has completed regarding the specific time period.

When the process has completed regarding the specific time period (Yes in Step S250), the video acquiring process ends. When the process has not completed regarding the specific time period (No in Step S250), the process returns to Step S210 to repeat the processing. Here, in the repeated process, the target time width selected in Step S210 is generally different from the target time width selected in the previous process. Typically, the target time width selected in Step S210 in the repeated process is the predetermined time width that is continuous in the forward/backward direction in time with respect to the target time width selected in the previous process.

In the case of streaming the surveillance video, the one or more processors 320 may be configured not to execute the processing in Step S250.

In addition, the one or more processors 320 may be configured to execute a process of reselecting the target time width when there is no camera suitable for the observation camera (No in Step S220), For example, in a case where there are some cameras that are temporarily located in the observation area within the target time width, the one or more processors 320 reselect the target time width such that any camera is located in the observation area. Typically, the one or more processors 320 shrink the target time width until any camera is located in the observation area. In this case, the camera located for the longest time in the observation area within the target time width will be selected as the observation camera. If the one or more processors 320 are configured to executed the process of resetting the target time width, when there is no camera that is temporarily located in the observation area within the target time width, the one or more processors 320 executes the processing in Step S242. In this manner, by the one or more processors 320 executing the process of resetting the target time width, it is possible to reduce occurrence of there is no video data available within the target time width. In addition, it is possible to display the surveillance video of a longer time for the observation area.

1-4. Effects

As described above, according to the first embodiment, the observation area is designated. Thereafter, the observation camera is selected from the plurality of cameras 110 for each predetermined time width. And the captured video data within the predetermined time width captured by the observation camera is acquired. Then, the captured video data acquired for each of the predetermined time width is output in chronological order as the surveillance video. Or a video data combining the captured video data acquired for each of the predetermined time width in chronological order is output as the surveillance video.

It is thus possible to output the surveillance video displaying a wide range of points. Where the surveillance video is composed of the captured video data captured by the plurality of cameras 110 each of which is mounted on the movable object 100. Further, the designation of the observation area may be performed to designate one segmented area of a space by grid. It is possible to make the designation of the observation area easier, and to make a highly convenient system. And the division by grid can easily provide segmented areas for the entire target space.

Furthermore, in the surveillance video output system 10 according to the first embodiment, in the video acquiring process, when there are two or more cameras having a relation with the time series position data in which data within the predetermined time width is included in the observation area, the observation camera is one camera with the longest distance to travel in the observation area within the predetermined time width. It is thus possible to select, as the observation camera, a camera that capturing in a wider range, and output the surveillance video displaying a wider range of points within the predetermined time width.

1-5. Modification

The surveillance video output system 10 according to the first embodiment may employ some modifications as follows. In the following description, matters overlapping with the above-described contents are appropriately omitted.

1-5-1. First Modification

In the first modification, the one or more processors 320 is further configured to receive designation of an observation direction in the observation area as an input. Then, in the video acquiring process, the one or more processors 320 execute selecting the observation camera under a further condition that a movement direction of the observation camera or a movement direction of the movable object 100 on which the observation camera is mounted satisfies the observation direction. Here, the designation of the observation direction can be realized by an operation of the input/output device 2. Examples of the operation of the input/output device 2 to designate the observation direction include designation of cardinal directions (east, west, or the like), designation of a orientation of the movable object 100, designation of a lane direction (left lane, right lane, or the like) in a case where a road shape is specified, and the like. The operation of the input/output device 2 to designate the observation may employ other operations.

Figure 8:
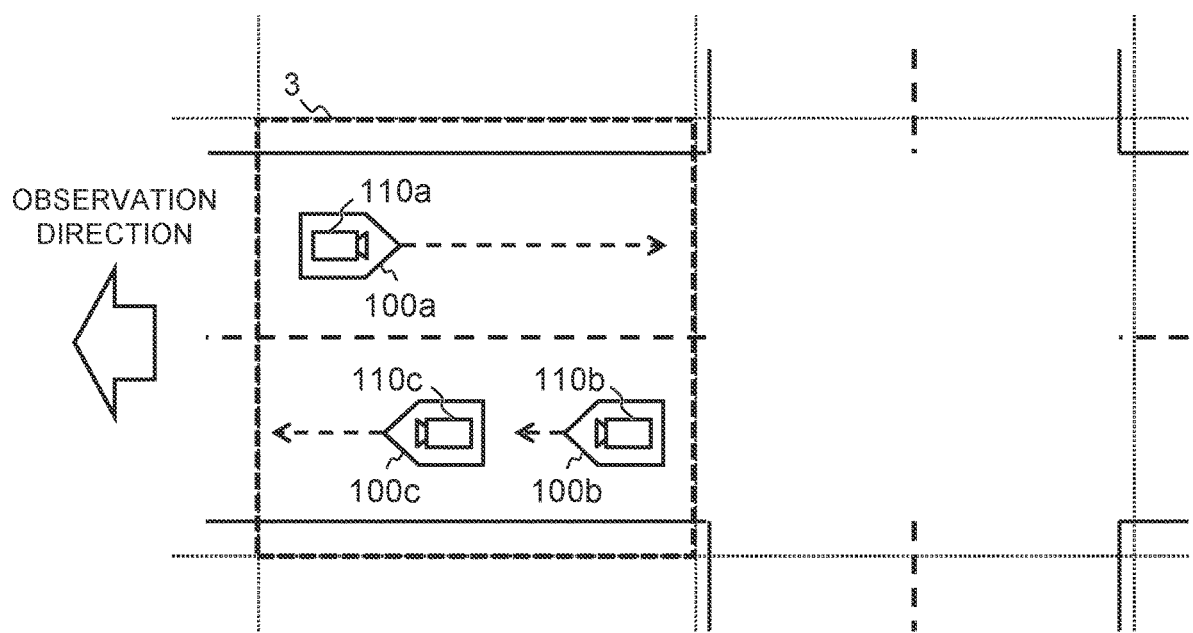
FIG. 8 is a conceptual diagram for explaining of selecting an observation camera in the video acquiring process according to the first modification.

FIG. 8 is a conceptual diagram for explaining of selecting the observation camera in the video acquiring process according to the first modification. In FIG. 8, similarly to the case shown in FIG. 3, the segmented area 3 is designated as the observation area. FIG. 8 shows a case where the left direction in the drawing is designated as the observation direction.

In FIG. 8, the camera 110a, the camera 110b, and the camera 110c are located in the observation area within the target time width. The traveling distances within the target time range in the observation area are longer in the order of the camera 110a, the camera 110c, and the camera 110b. But the movement direction of the camera 110a is the right direction in the figure. That is the movement direction of the camera 110a does not satisfy the observation direction. Therefore, in the case shown in FIG. 8, the one or more processors 320 select the camera 110c as the observation camera in the video acquiring process according to the first modification.

By employing the first modification, it is possible to output the surveillance video displaying a desired direction. Consequently, convenience of the surveillance video output system 10 improves.

1-5-2. Second Modification

Figure 9:
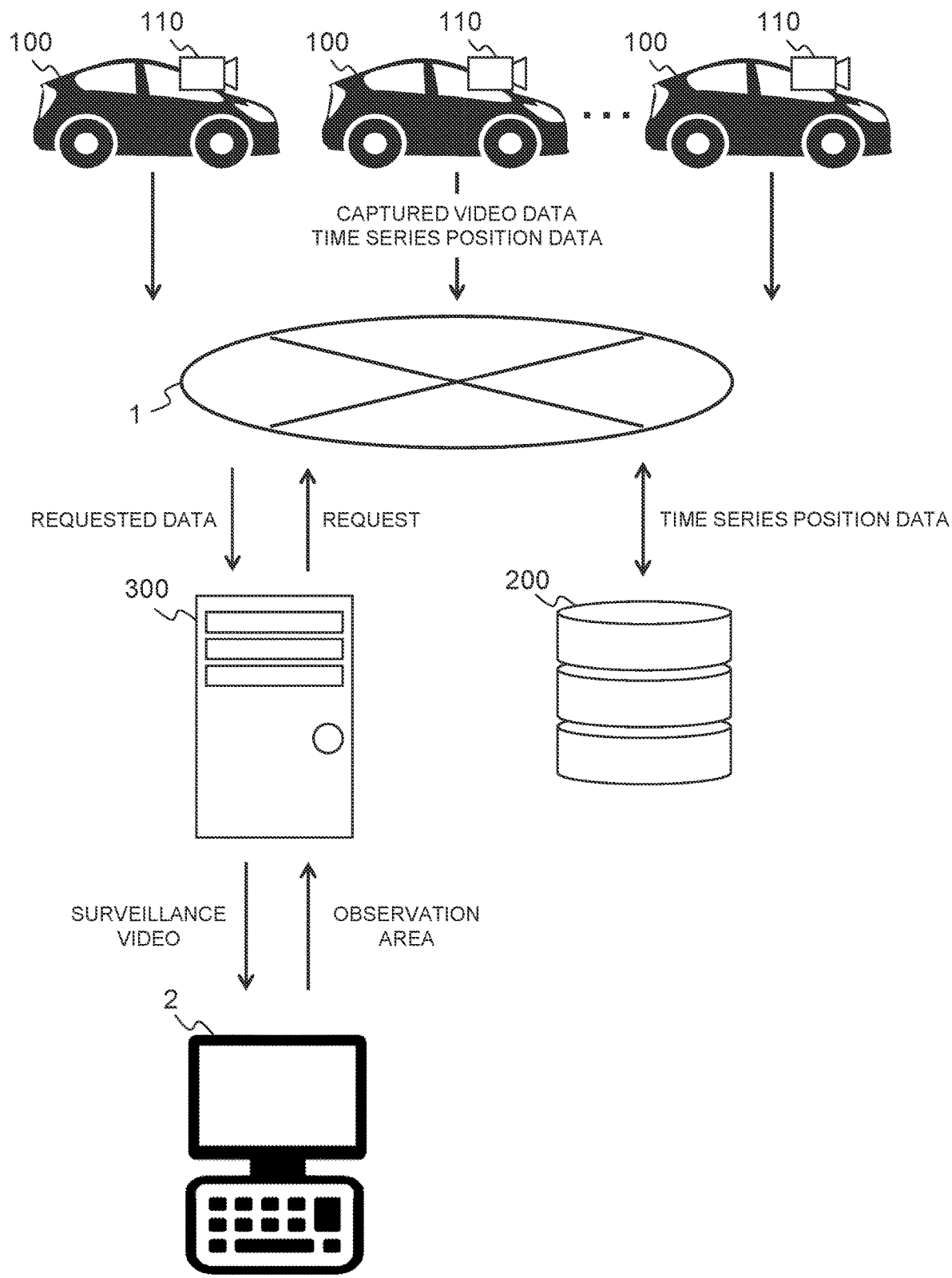
FIG. 9 is a conceptual diagram showing an outline of a configuration of a surveillance video output system according to the second modification.

In the second modification, the processing apparatus 300 is configured to acquire the captured video data from the movable object 100. FIG. 9 is a conceptual diagram showing an outline of the configuration of the surveillance video output system 10 according to the second modification.

As shown in FIG. 9, in the surveillance video outputting system 10 according to the second modification, the memory 200 stores and manages the time series position data but does not manage the captured video data. In the surveillance video outputting system 10 according to the second modification, the movable object 100 stores and manages the captured video data.

The processing apparatus 300 is connected to the communication network 1. And the processing apparatus 300 acquires the time series position data from the memory 200 via the communication network 1. Then, the processing apparatus 300 is configured to request the captured video data to the movable object 100 on which the observation camera selected in the video acquiring process is mounted. And the processing apparatus 300 acquires the captured video data captured of the observation camera via the communication network 1.

Figure 10:
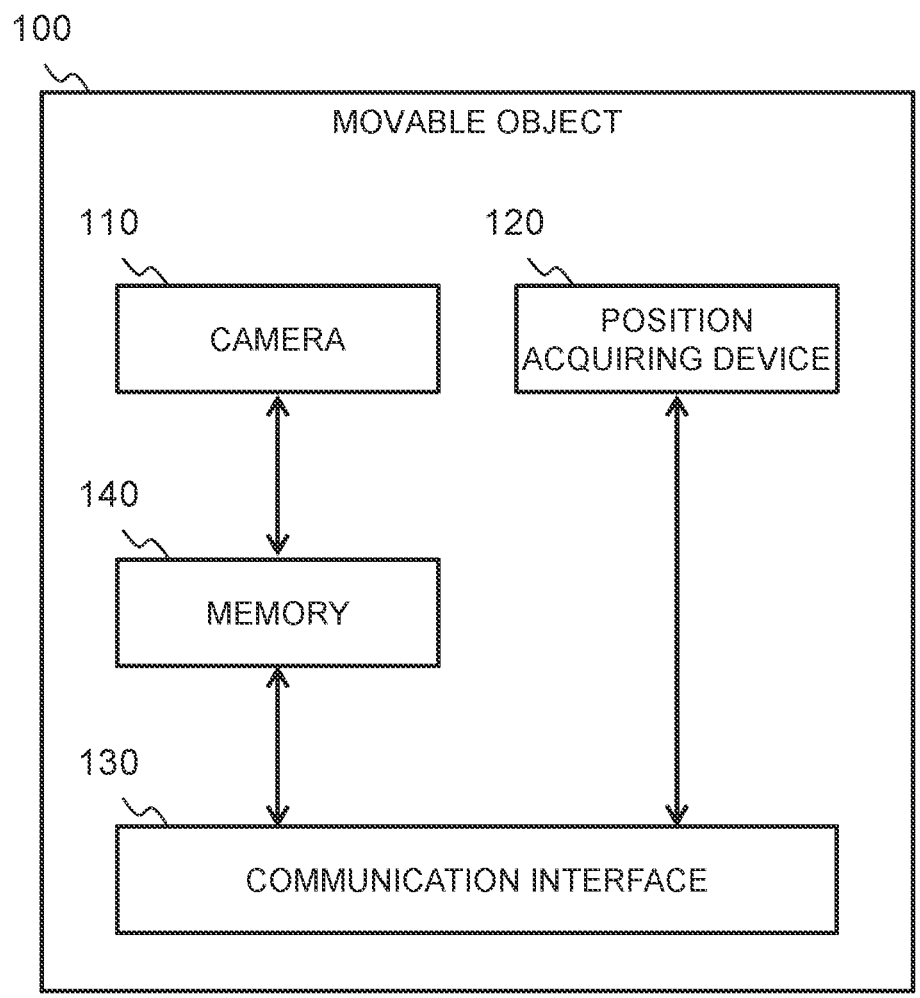
FIG. 10 is a block diagram showing a schematic configuration of a movable object according to the second modification.

FIG. 10 shows a schematic configuration of the movable object 100 according to the second modification. In the surveillance video outputting system 10 according to the second modification, the movable object 100 stores and manages the captured video data captured by the camera 110 in a memory 140. Then, the movable object 100 transmits the captured video data via the communication interface 130 in response to the request from the processing apparatus 300.

Even when the surveillance video output system 10 according to the second modification is employed, the one or more processors 320 can be configured to execute the same process as the process described above. Furthermore, it is possible to achieve the same effects as described above.

2. Second Embodiment

Hereinafter, a second embodiment will be described. In the following description, matters overlapping with those of the first embodiment are appropriately omitted.

Figure 11:
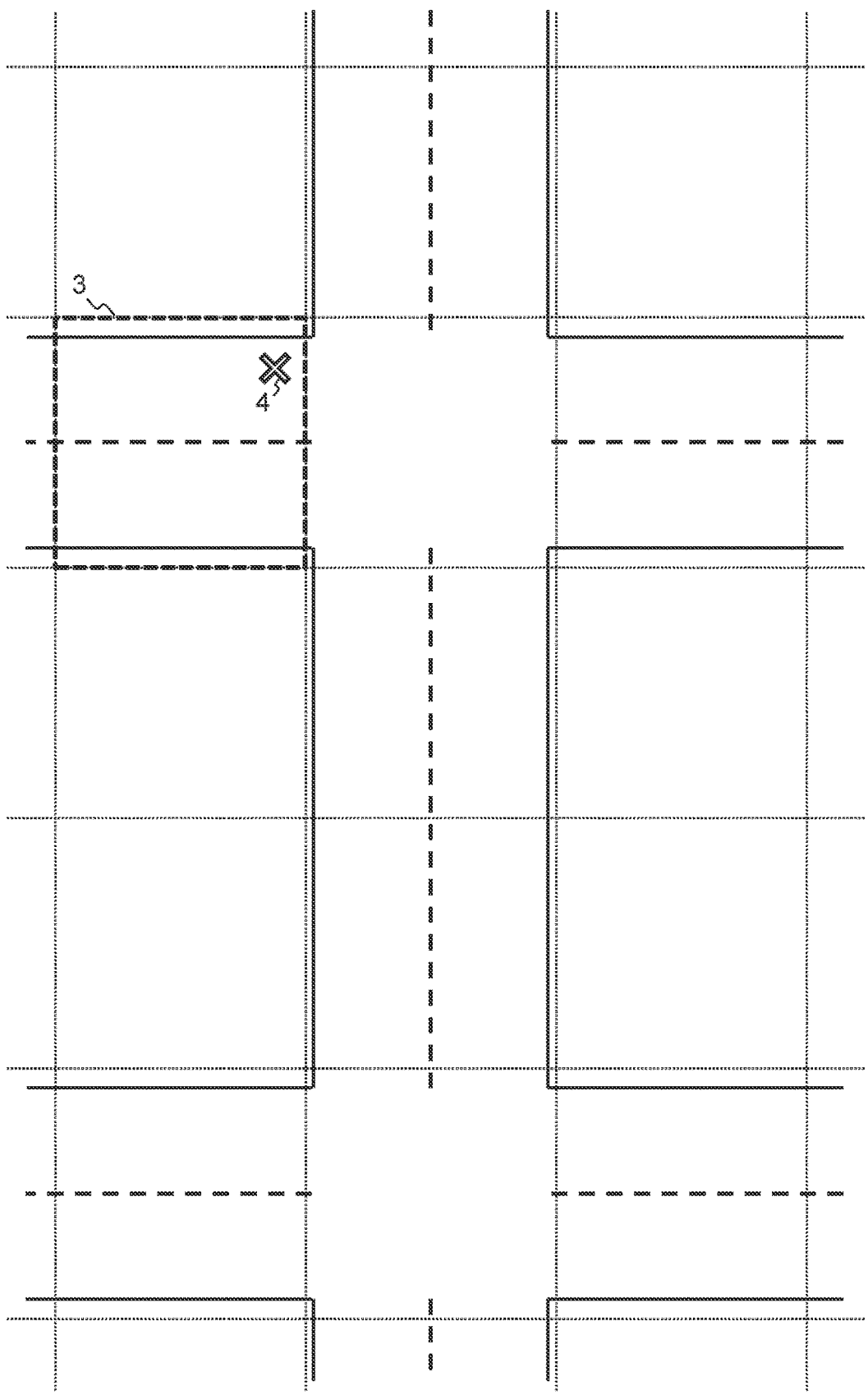
FIG. 11 is a conceptual diagram showing an example of designation of an observation point in a surveillance video output system according to the second embodiment.

In contrast to the first embodiment, the second embodiment is characterized by the process of selecting the observation camera in the video acquiring process (Step S230 shown in FIG. 7). In the surveillance video output system 10 according to the second embodiment, the one or more processors 320 are configured to execute receiving, as an input, designation of an observation point in the observation area. FIG. 11 is a conceptual diagram illustrating an example of the designation of the observation point. FIG. 11 is a drawing similar to FIG. 2, wherein the segmented area 3 is designated as the observation area. In FIG. 11, a point 4 in the observation area is the observation point. A method for designation of the observation point may employ a suitable method in accordance with an environment in which the surveillance video output system 10 according to the second embodiment. Examples of the method for designation of the observation point include designating an arbitrary point on the road map displayed on the output unit of the input/output device 2, selecting one from a plurality of candidates each of which show a specific point in the observation area, and the like.

In the surveillance video output system 10 according to the second embodiment, in the video acquiring process, when there are two or more cameras having a relation with the time series position data in which data within the predetermined time width is included in the observation area, the one or more processors 320 are configured to select one camera with the shortest time average distance to the observation point within the predetermined time width based on the time series position data.

Figure 12:
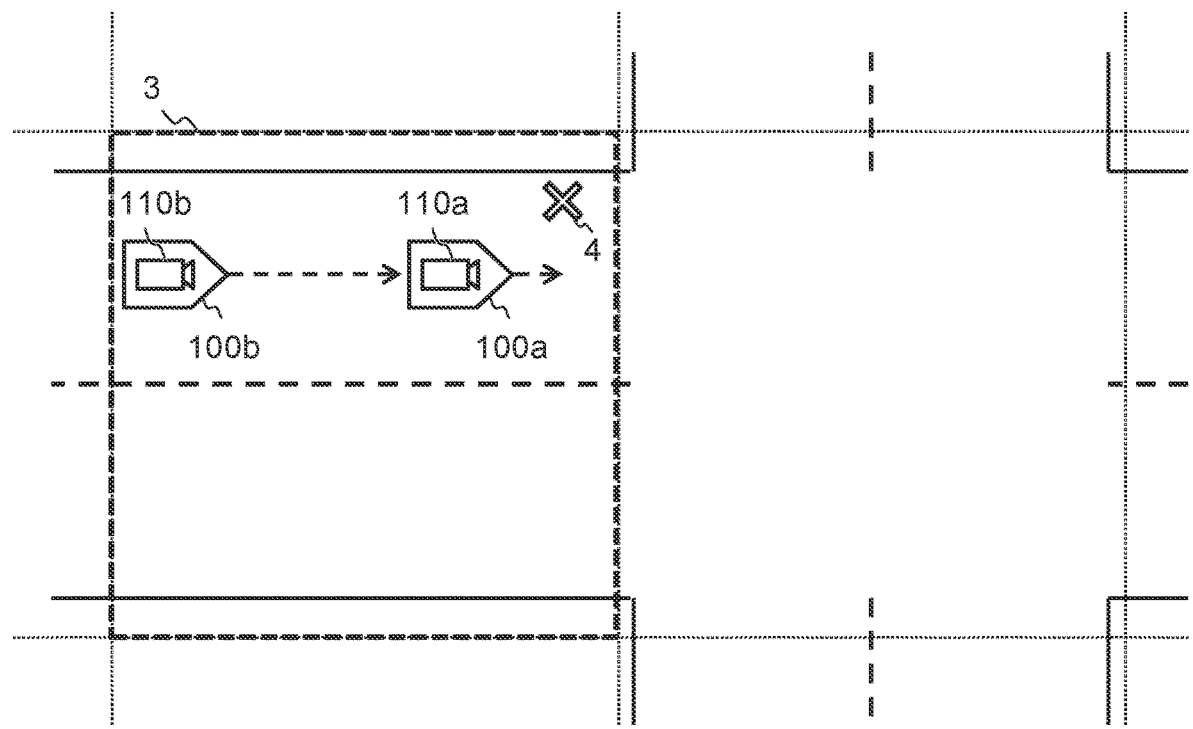
FIG. 12 is a conceptual diagram for explaining of selecting an observation camera in the video acquiring process according to the second embodiment.

FIG. 12 is a conceptual diagram for explaining of selecting the observation camera in the video acquiring process according to the second embodiment. FIG. 12 shows the case where the observation area is the segmented area 3, and the observation point is the point 4.

In FIG. 12, the camera 110*a* and the camera 110*b* are located in the observation area within the target time width. On the other hand, the time average distance to the observation point within the target time width of the camera 110*a* is shorter than the camera 110*b*. Therefore, in the case shown in FIG. 12, the one or more processors 320 select the camera 110*a* as the observation camera in the video acquiring process according to the second embodiment.

As described above, according to the second embodiment, when there are two or more cameras having a relation with the time series position data in which data within the predetermined time width is included in the observation area, the observation camera is a camera with the shortest time average distance to the observation point within the predetermined time width. It is thus possible to output the surveillance video displaying mainly the observation point. Other configurations and processes of the second embodiment may be the same as those of the first embodiment. The first modification and the second modification described above can also be applied to the second embodiment.

What is claimed is:

1. A system comprising:
    a plurality of cameras each of which is mounted on a respective movable object;
    one or more memories storing, for each of the plurality of cameras, captured video data and time series position data that show a camera position or a movable object position at each time; and
    one or more processors configured to execute:
        receiving designation of an observation area;
        selecting, for each predetermined time width, an observation camera from the plurality of cameras, the observation camera having a relation with the time series position data in which data within the predetermined time width are included in the observation area;
        acquiring the captured video data within the predetermined time width captured by the observation camera; and
        outputting the captured video data acquired for each of the predetermined time width in chronological order, or outputting a video data combining the captured video data acquired for each of the predetermined time width in chronological order,
    wherein the selecting the observation camera includes, when there are two or more cameras having a relation with the time series position data in which data within the predetermined time width are included in the observation area, selecting one camera with the longest distance to travel in the observation area within the predetermined time width.

2. The system according to claim 1, wherein
    the one or more processors are further configured to execute receiving designation of an observation direction in the observation area, and the selecting the observation camera includes selecting the observation camera under a further condition that a movement direction of the observation camera or a movement direction of the respective movable object satisfies the observation direction.

3. The system according to claim 2, wherein
the observation area is a segmented area of a space divided by grid.

4. A method comprising:
storing, for each of a plurality of cameras which is mounted on a respective movable object, captured video data and time series position data that show a camera position or a movable object position at each time in one or more memories;
receiving designation of an observation area;
selecting, for each predetermined time width, an observation camera from the plurality of cameras, the observation camera having a relation with the time series position data in which data within the predetermined time width are included in the observation area;
acquiring the captured video data within the predetermined time width captured by the observation camera; and
outputting the captured video data acquired for each of the predetermined time width in chronological order, or outputting a video data combining the captured video data acquired for each of the predetermined time width in chronological order,
wherein the selecting the observation camera includes, when there are two or more cameras having a relation with the time series position data in which data within the predetermined time width are included in the observation area, selecting one camera with the longest distance to travel in the observation area within the predetermined time width.

5. The method according to claim 4, further comprising receiving designation of an observation direction in the observation area,
wherein the selecting the observation camera includes selecting the observation camera under a further condition that a movement direction of the observation camera or a movement direction of the respective movable object satisfies the observation direction.

6. The method according to claim 5, wherein
the observation area is a segmented area of a space divided by grid.

* * * * *